US005244319A

United States Patent [19]

Cochran

[11] Patent Number: 5,244,319

[45] Date of Patent: Sep. 14, 1993

[54] AUGER BIT

[75] Inventor: Paul Cochran, Stillman Valley, Ill.

[73] Assignee: Greenlee Textron Inc., Rockford, Ill.

[21] Appl. No.: 786,793

[22] Filed: Nov. 1, 1991

[51] Int. Cl.[5] .......... B23B 51/02

[52] U.S. Cl. .......... 408/211; 76/102; 408/214

[58] Field of Search .......... 408/211, 212, 213, 214, 408/225, 230; 76/108.6, 102; 144/221

[56] References Cited

U.S. PATENT DOCUMENTS

| | | | |
|---|---|---|---|
| 235,234 | 12/1880 | Hardisty | 408/212 |
| 433,683 | 8/1890 | Jennings | 408/212 |
| 2,652,083 | 9/1953 | Emmons | 408/211 |
| 4,529,341 | 7/1985 | Greene | 408/211 |
| 4,968,193 | 11/1990 | Chaconas et al. | 408/225 |

FOREIGN PATENT DOCUMENTS

| | | | |
|---|---|---|---|
| 1097104 | 3/1981 | Canada | 408/225 |
| 1238905 | 6/1986 | U.S.S.R. | 408/230 |

OTHER PUBLICATIONS

Greenlee Textron, Inc. Product Catalog, pp. 98 and 99.

*Primary Examiner*—Daniel W. Howell

*Attorney, Agent, or Firm*—Trexler, Bushnell, Giangiorgi & Blackstone, Ltd.

[57] ABSTRACT

A boring bit for boring holes in one or more workpieces such as wood and the like. An axially elongated shank portion of the boring bit has a tool engaging portion at one end and a head portion on a second end. A central axis longitudinally extends through the shank portion. The head portion includes a helically disposed surface on the end of the head portion which is frusto-conically sloped inwardly towards the central axis and generally towards the tool engaging portion. The helical surface has leading and following termini of which the leading terminus is advanced beyond the following terminus more than one-half of a helical revolution around the central axis along the shank portion. A cutting face, which is a planar surface, is perpendicularly spaced away from and extends parallel to the central axis. The cutting face intersects the leading terminus for scribing the bore circumference and scraping material from a workpiece when the boring bit is employed to form a bore in such a workpiece. A cutting edge and a scraping edge are defined by an intersection of the cutting face with the helical surface and a perimeter surface of the shank portion, respectively. A scribing edge is defined by an intersection of the helical surface and the perimeter surface of the shank portion. A scribing tip is defined by an intersection of the scraping edge, cutting edge, and scribing edge. The scribing tip facilitates the scribing function of the boring bit. A threaded lead screw portion axially extends away from the head portion for piloting the boring bit into a workpiece during a boring operation. Spaced apart spiral flutes are formed around the perimeter surface of the shank portion for removing material from the bored hole during the bore forming operation.

22 Claims, 2 Drawing Sheets

Fig. 1
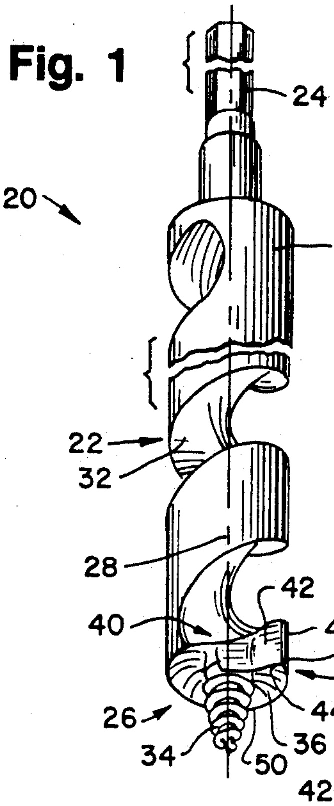
Fig. 3
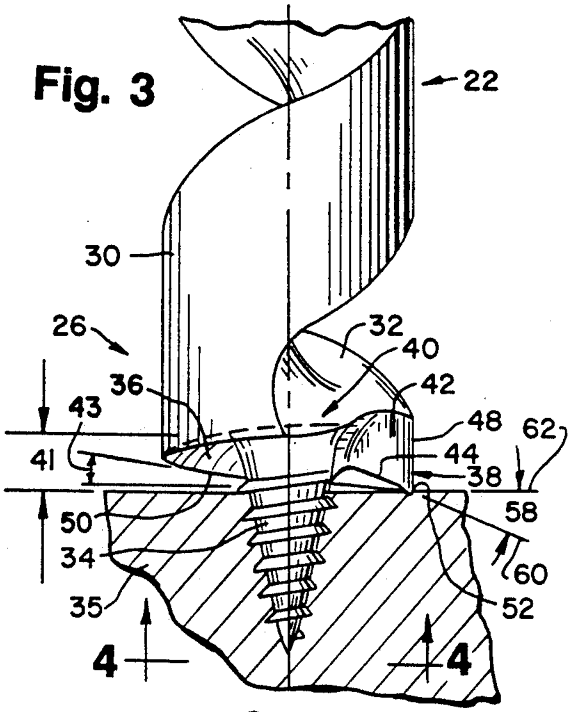
Fig. 3A
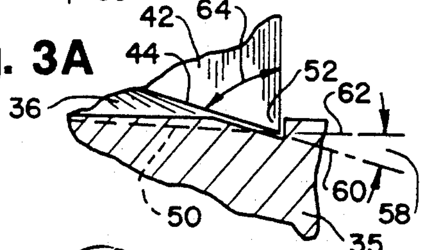
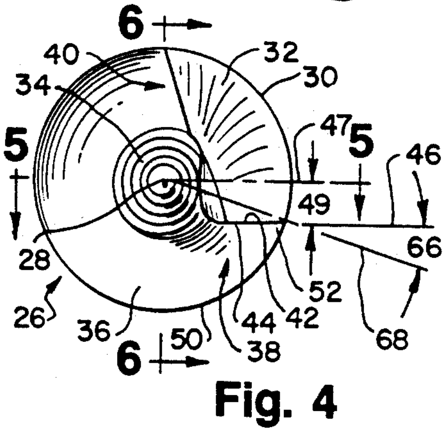
Fig. 4
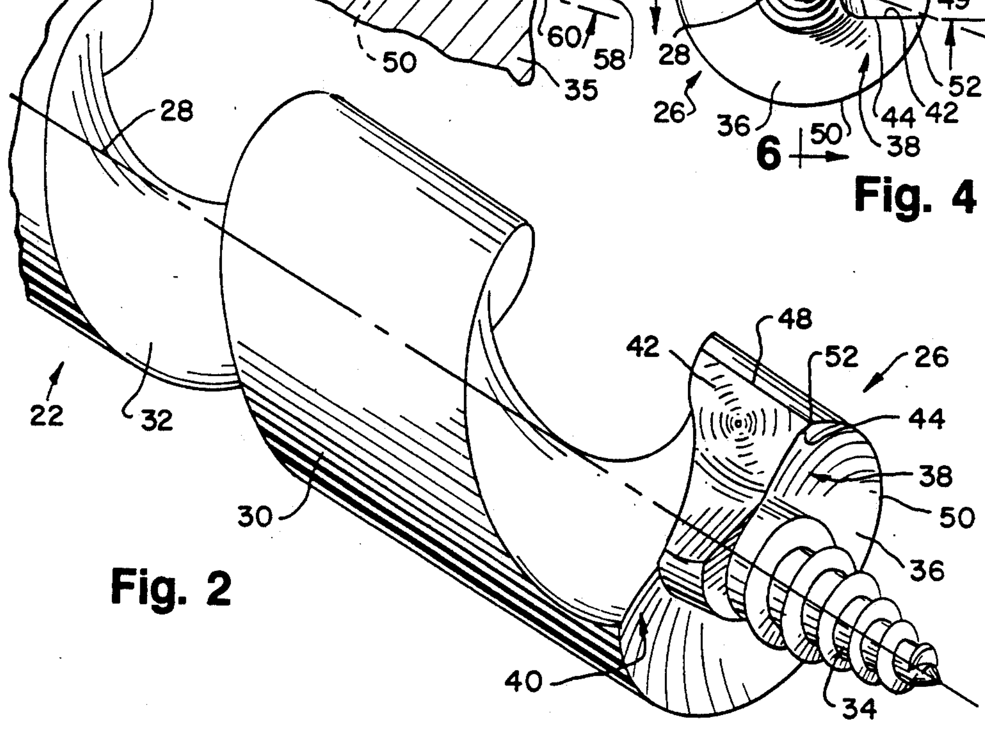
Fig. 2

AUGER BIT

BACKGROUND OF THE INVENTION

The present application pertains to bore drilling tool bits for forming bores in materials such as wood and the like.

Many aspects of the building construction industry involve installation of various means for providing services such as wiring, plumbing, and pipe fitting. These various disciplines, as well as others, involve attaching or routing such means through the structural components of a building.

For example, when a home is constructed, an initial step involves framing in the building or in other words assembling the wall studs, roof joists, floor joists, and other structural elements. Once the house is "framed in", and prior to installing wall covering materials, the service delivery disciplines such as electricians, plumbers, and pipe fitters, enter the structure in order to install their respective services.

By way of example, reference will be made to electrical installations in a home construction. An electrician will commonly route wiring between joists and wall studs, however, there are many instances where the wiring, or conduit, must pass through a joist or a wall stud. In such a situation, a bore must be formed through the structural element and the wiring threaded therethrough. While it is known that drill bits or bore forming tool bits may be used to form a bore in a structural element composed of wood or another material, this task becomes increasingly difficult with the thickness of the material as well as any obstructions which may pass through the bore path in the material. A typical method of providing stronger structural supports using wooden members is to attach two or more members by nails or other fasteners. Clearly, if an electrician is required to drill through an area where nails are embedded in the wood, the task of forming a bore through such a structural element can be difficult if not impossible.

A problem arises when forming a bore through such a structural element because of the type of bits which are currently available. While many bits will serve the purpose of forming a bore, even through nails extending through the bore path, such bits quickly become dull and various features of the bit may even fail during the boring operation. Spurs are often formed on the forwardmost surface along the circumferential edge of such surface for scribing the circumference of the bore. By scribing the circumference, the material within the circumference is more easily removed during the boring operation. However, due to the protruding shape of most spurs, when a nail is encountered in the bore path the spur may be either damaged or broken off of the head of the bore forming tool bit.

In order to overcome the problems encountered with spurs in such a bore forming operation, various bits have been developed which eliminate the spur. Elimination of the spur results in a bore hole that is rough and rather ragged with fibers extending from the surface of the bore when a bore is formed in a materials such as wood. The ragged internal surface of the bore is a result of wood being rather fibrous and stringy. If the fibers of the wood are not severed, such as is done by scribing the circumference of the bore with a spur, the fibers are torn and leave a ragged inside surface.

A ragged inside surface of a bore extending through several pieces of structural lumber presents a problem to electricians and other disciplines in that it hampers the routing of cables or pipes through such a bore. Further, the ragged inside surface may require a larger bore to be drilled through the structural lumber in order to compensate for the additional ragged fibers extending into the bore. It is desirable to form as small a bore as possible to maintain the highest structural integrity of the structural member. As such, it is not desirable to have a ragged inside surface of a bore.

Another consequence of bore drilling without scribing is that the surface around the perimeter of the exit hole is splintered. The splintered exit surface perimeter results from failing to sever the fibers of the exit surface causing the fibers to be ripped along the exit surface. Additionally, not only does a ragged and splintered bore become more difficult to work with and possibly weaken the structural integrity of the structural member, such workmanship is unsightly, aesthetically unpleasing, and looked down upon in the building trades industry.

Therefore, it would be desirable to provide a bore drilling tool bit which is capable of forming a bore through material such as wood and the like which forms a smooth inside surface in the bore during the boring operation. It is also desirable to provide a bore forming tool bit which is generally unaffected by nails or other obstructions extending through the material in the bore path. To our knowledge, such a bore forming tool bit is not available.

OBJECTS AND SUMMARY OF THE INVENTION

It is a general object of the present invention to provide a bore forming tool bit which forms a bore through materials such as wood and the like and is generally unaffected by nails or other obstructions extending through the bore path.

It is another object of the present invention to provide a bore forming tool bit which scribes the circumference of the bore prior to removing material from within the scribed circumference of the bore path.

It is yet another object of the present invention to provide a bore forming tool bit which is easily and efficiently formed.

Briefly and in accordance with the foregoing, the present invention comprises a boring bit for boring holes in one or more workpieces such as wood and the like. An axially elongated shank portion of the boring bit has a tool engaging portion at one end and a head portion on a second end. A central axis longitudinally extends through the shank portion. The head portion includes a helically disposed surface on the end of the head portion which is frusto-conically sloped inwardly towards the central axis and generally towards the tool engaging portion. The helical surface has leading and following termini of which the leading terminus is advanced beyond the following terminus more than one-half of a helical revolution around the central axis along the shank portion. A cutting face, which is a planar surface, is perpendicularly spaced away from and extends parallel to the central axis. The cutting face intersects the leading terminus for scribing the bore circumference and scraping material from a workpiece when the boring bit is employed to form a bore in such a workpiece. A cutting edge and a scraping edge are defined by an intersection of the cutting face with the helical surface and a perimeter surface of the shank portion, respectively. A scribing edge is defined by an intersection of the helical surface and the perimeter surface of the shank portion. A scribing tip is defined by an intersection of the scraping edge, cutting edge, and scribing edge. The scribing tip facilitates the scribing function of the boring bit. A threaded lead screw portion axially extends away from the head portion for piloting the boring bit into a workpiece during a boring operation. Spaced apart spiral flutes are formed around the perimeter surface of the shank portion for removing material from the bored hole during the bore forming operation.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 1 is an abbreviated side elevational view of a boring bit of the present invention;

FIG. 2 is an enlarged perspective view of a head portion of the boring bit;

FIG. 3 is an enlarged side elevational view of the head portion of the boring bit;

FIG. 3A is an enlarged fragmentary partial cross sectional view of a scribing tip of the boring bit scribing the circumference of the bore in a workpiece FIG. 4 is an enlarged plan view of the head portion taken along line 4—4 in FIG. 3;

DETAILED DESCRIPTION OF THE ILLUSTRATED EMBODIMENT

Figure 5:
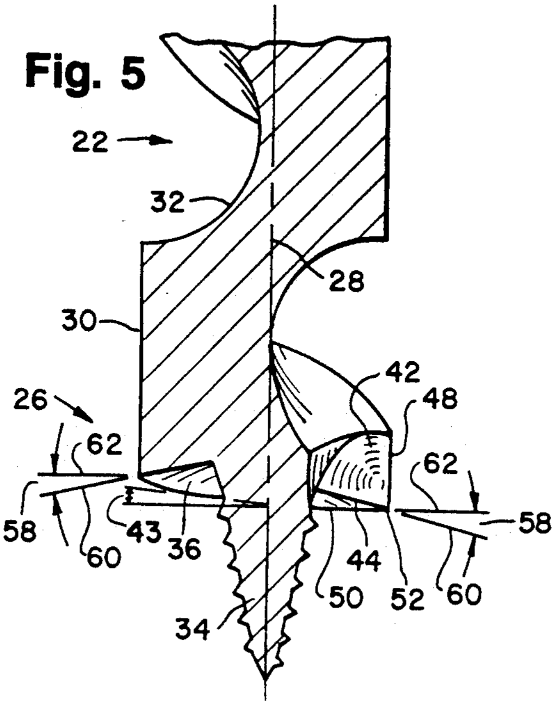
FIG. 5 is a cross-sectional view of the head portion of the boring bit taken along line 5—5 in FIG. 4 illustrating a planar cutting face and a forward rake lead angle on a helically disposed surface of the head portion.
Figure 6:
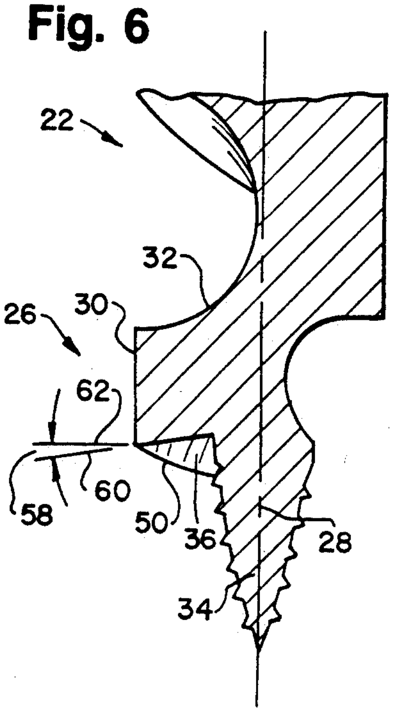
FIG. 6 is a cross-sectional view of the head portion of the boring bit taken along line 6—6 in FIG. 4 illustrating the slope of a spiral flute formed in a shank portion of the boring bit as well as the planar cutting face and the forward rake lead angle on the helically disposed surface of the head portion.

While the invention may be susceptible to embodiment in different forms, there is shown in the drawings, and herein will be described in detail, a specific embodiment with the understanding that the present disclosure is to be considered an exemplification of the principles of the invention and is not intended to limit the invention to that as illustrated and described herein.

Referring now to the drawings, wherein like parts are designated by the same reference numerals throughout the figures, a boring bit 20 in accordance with the present invention is shown in FIG. 1. The boring bit 20 has an elongated shank portion 22 having tool engaging means 24 at one end and a work entering head portion 26 at an end distal the tool engaging means 24. A central axis 28 longitudinally extends through the shank 22. A perimeter surface 30 of the shank 22 has a large spirally formed flute 32 formed therein which extends from the head portion 26 to the tool engaging means 24. The flute 32 travels spirally around the shank 22 generally coaxial with the central axis 28.

The tool engaging means 24 can be any one of a well-known configuration used to engage a boring bit or drill bit in a drill bit driving tool. As shown in FIG. 1, the tool engaging means 24 is a formed end of the shank 22 which is sized and dimensioned for retention in a chuck portion of a bit driving tool. The shank portion 22 as shown in FIG. 1 has been abbreviated since the shank 22 is essentially comprised of the outer perimeter surface 30 with the flute 32 formed therethrough. The overall length of the boring bit 20 may be quite long measuring 18 inches from the tool engaging means 24 to the tip of a threaded lead screw 34 formed on the end of the head portion 26. Of course, longer and shorter bits employing the configuration of the present invention may be produced.

FIGS. 2, 3, 3A, and 4 are referred to in order to provide more detail in describing the present invention. FIG. 3 shows the boring bit 20 in the initial stages of boring into a workpiece 35. FIG. 4 provides a plan view of boring bit 20 in which the workpiece has been removed in the interest of more clearly illustrating the boring bit 20. Further, the direction of rotation of the boring bit 20 of the present invention in a counter clockwise direction is represented by arrow 37.

As shown in the enlarged perspective view of the head portion 26 in FIG. 2, the head portion 26 comprises a group of functional edges and surfaces. The threaded lead screw 34 extends away from the head portion 26 generally coaxial with the central axis 28. At the forwardmost end of the head portion 26, yet behind and surrounding the threaded lead screw 34, is a helically disposed surface 36. The helically disposed surface 36 has a lead terminus 38 and a following terminus 40. As shown in FIGS. 2 and 3, the lead terminus 38 is advanced forwardly beyond the following terminus 40 more than one half of a revolution around the helical surface 36 and generally three quarters of a revolution therearound. FIG. 4 provides a better view of the spacing of the lead terminus 38 and the following terminus 40 on the head portion 26. A helical drop dimension 41 is measured between the lead terminus 38 and the following terminus 40. A helically sloped component 43 is formed at an angle of 3° to 9°.

A cutting face 42 is formed intersecting the lead terminus 38 of the helically disposed surface 36. A cutting edge 44 is formed at the intersection of the cutting face 42 and the lead terminus 38. The function of the cutting edge 44 will be described in greater detail hereinbelow. The following terminus 40 generally merges with the flute 32 for promoting the removal of scrap material created by the head portion 26 during a boring operation. The scrap material is rotatably transported up through the flute 32 and out of the bore formed by the boring bit.

With further reference to FIGS. 3–6, the cutting face 42 lies in a plane 46 which is generally parallel to a plane 47 extending through the central axis 28 and perpendicularly spaced a distance 49 away therefrom. As clearly shown in FIG. 4, the plane 46 of the cutting face 42 is not co-planar with any radius extending from the central axis 38. A scraping edge 48 is formed at an intersection of the cutting face and the perimeter surface 30 of the shank 22. A helical scribing edge 50 is formed at the intersection of the helically disposed surface 36 and the perimeter surface 30 of the shank 22. The three above-described edges, including the scraping edge 48, the cutting edge 44 and the scribing edge 50, intersect at a scribing point 52. The scribing point 52 is at the forwardmost edge of the helically disposed surface 36 and is the first point of contact, after the threaded lead screw 34, with a workpiece when the boring bit 20 is employed to form a bore.

The scribing tip 52 and the surfaces and edges associated therewith provide many advantages over the prior art. While the scribing tip 52 protrudes from the head portion 46, it is merged with and structurally supported and reinforced by the material comprising the head portion 46. Structural support and reinforcement of the scribing tip 52 promotes resistance to impact failure from impact forces associated with the boring operation. The scribing tip 52 is resistant to sudden impact failure when it encounters nails or other obstructions in the bore path. The generally small helical drop 41 and the smoothly helically curved scribing edge 50 combine to provide continuous scribing action. In contrast, prior art boring bits tend to produce abrupt intermittent scribing action due to the protruding shape of prior art scribing spurs.

The inwardly directed frusto-conical shape of the helical surface 36 promotes gradual sequential scribing and cutting by the scribing edge 50 and the inwardly angled cutting edge 44, respectively. This scribing/cutting action gradually cuts through obstructions, including nails by removing small pieces with each revolution of the scribing tip 52 followed by continued cutting by the cutting edge 44 and scribing by the scribing edge 50. In contrast, some forms of boring bits use chipping edges, see FIGS. 7–9, which are perpendicular to the central axis and tend to tear or "chew-up" the material in the workpiece. Such chipping edges tend to become pitted or gouged upon impact with obstructions such as nails reducing the useful life of the tool and producing a ragged bore.

As shown in FIG. 3, the head portion 26 of the boring bit 20 is being urged into a workpiece 35 to form a bore therein. The threaded lead screw 34 is threadedly embedded in the workpiece 35 thereby piloting the boring bit 20 along the central axis 28 extending through the lead screw portion 34. As shown with greater detail in FIG. 3A, the scribing tip 52 has started to scribe a groove 56 in the workpiece 35 thereby severing fibers extending through the workpiece 35 such as i found in wood. By severing fibers in the workpiece, the cutting edge 44 can more efficiently remove material in the path of the boring bit 20 during the boring operation. Additionally, the scraping edge 48 scrapes an inside diameter of the bore formed by the bit 20 to produce a smoother inside surface in the finished bore.

With reference to FIGS. 3, 3A, 5 and 6, side elevational views (cross sectioned in FIGS. 5 and 6) of the head portion 26 of the bit 20 are illustrated. As shown in the cross-section of FIG. 5, the cutting edge 44 is formed at a forward rake lead angle 58. The forward rake lead angle 58 is measured between a reference 60 extending from the central axis 28 along the helical surface 36 through the scribing edge 50 and a reference line 62 defined as a line perpendicularly extending from the central axis 28 through the scribing edge 50. The perpendicular reference line 62 is co-planar with the plane 46 of the cutting face 42 as illustrated in FIG. 4.

This forward rake lead angle 58 results in a generally frusto-conical shape of the helically disposed surface 36. This frusto-conical shape of the helical surface 36 is also shown in FIGS. 1, 2, 3 and 6. The forward rake lead angle 58 is formed at an angle ranging from 3° to 9° with 5°, plus or minus a predetermined tolerance, being a preferred angle. As a result of the cutting edge 44 being inwardly sloped towards the central axis 28 at an angle defined by the forward rake lead angle 58, the scraping edge 48 and cutting edge 44 intersect along the cutting face 42 at an acute angle 64.

Figure 7:
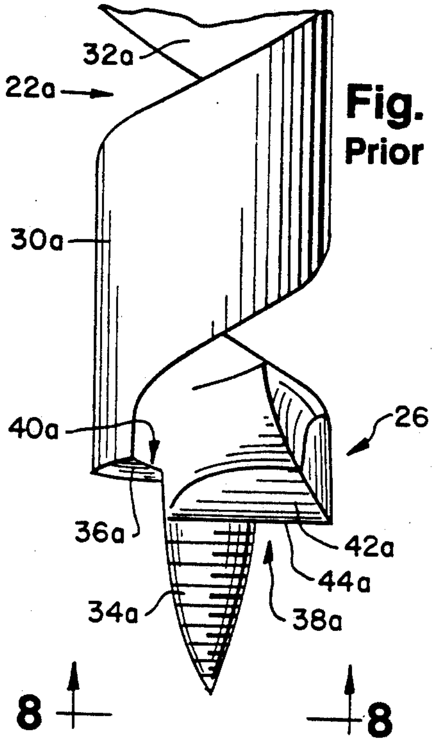
Fig. 7 Prior Art
FIG. 7 is an enlarged side elevational view of a head portion of a prior art boring bit.
Figure 8:
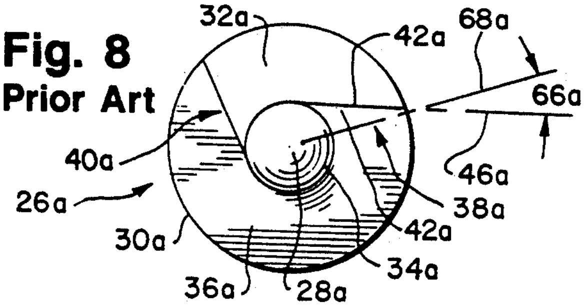
Fig. 8 Prior Art
FIG. 8 is an enlarged plan view of the head portion of the prior art boring bit shown in FIG. 7 taken along line 8—8 in FIG. 7.
Figure 9:
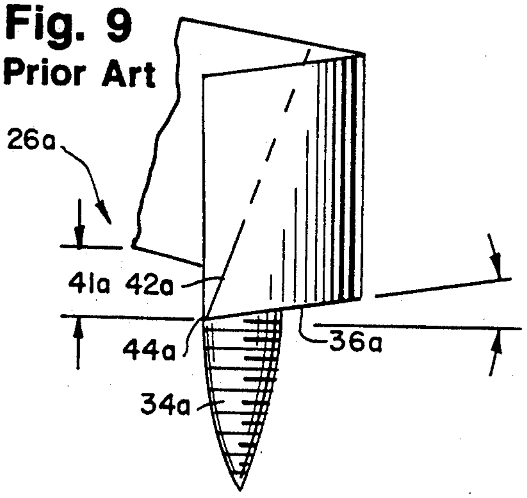
Fig. 9 Prior Art
FIG. 9 is an enlarged side elevational view of the head portion as shown in FIG. 7 rotated 90° showing a flat or outwardly disposed helical surface.

Reference to the prior art as illustrated in FIGS. 7–9 will use identical reference numerals to describe similar features as illustrated in the present invention with the addition of a lower case suffix to the reference numeral to denote the prior art feature.

The cutting face 42 is also formed at a radial rake angle 66 which is measured between the plane of the cutting face 46 and a reference radius 68 extending from the central axis 28 through the scribing tip 52. It should be noted that the radial rake angle 66 of the cutting face 42 of the present invention is a positive angle with regard to the reference radius 68, whereas a radial rake angle 66*a* of the prior art, as shown in FIG. 8, is a negative angle with respect to a corresponding reference radius 68*a*. As shown in FIG. 8, the prior art radial rake angle 66*a* is defined between a reference radius 68*a* and a plane 46*a* extending through the cutting face 42*a*. Following the direction of rotation 37 of the present invention and the direction of rotation 37*a* of the prior art, the reference plane 46 is in front of the reference radius 68 in the present invention, whereas the reference plane 46*a* is behind the reference radius 68*a* in the prior art.

The radial rake angle 66 ranges from 3° to 30° having a preferred angle of 15°, plus or minus a predetermined tolerance. Reference is made to FIGS. 7 and 9 of the prior art which indicate that a surface 36*a* formed on the head portion 26*a* of the prior art boring bit 20*a* does follow a helical path, but does not slope inwardly towards a central axis 28*a*. Clearly, as shown in FIG. 7, the surface 36*a* is substantially perpendicular to the central axis 28*a*.

A novel method is used to quickly and efficiently produce the apparatus of the present invention. In producing the present invention, the shank 22 is provided and the tool engaging means 24 and head portion 26 are formed on the ends thereof. The spirally extending flute 32 is formed on the shank portion 22 between the tool engaging means 24 and the head portion 26. Next, the head portion 26 is machined to form a threaded lead screw 34 on the extreme end thereof. The surface of the head portion 26 surrounding the threaded lead screw 34 is formed with the helically disposed surface 36. During the machine operation in which the helically disposed surface 36 is formed, the helically disposed surface 36 is angled inwardly towards the central axis 26 forming the frusto-conical shape in the helical surface 36. As a result of machining the helical surface 36 in this manner, the scribing edge 50 is formed at an acute angle 64 at the intersection between the perimeter surface 30 of the shank portion 22 and the helical surface 36.

The head portion 36 is then machined to form the cutting face 42. A cutting tool is positioned to form the lead terminus 38 creating the flat cutting face 42 lying in a plane 46. The machining operation results in the cutting face 42 which is parallel to and perpendicularly offset from the central axis 26. More specifically, as shown in FIG. 4, the plane 46 of the cutting face 42 is generally tangential to the threaded lead screw 34.

A more specific way of forming the cutting face 42 is to mill the lead terminus 38 to produce the cutting face 42 lying in the plane 46. As a result of such an operation, an arcuate edge 70 is formed opposite the scribing point 52.

The method of forming the present invention is extremely efficient because only a few uncomplicated operations or steps are required to transform the shank 22, formed with a generally defined head portion 26 and tool engaging means 24, into a boring bit 20. The operations of forming the generally defined head portion 26 and the tool engaging means 24 are common to this family of boring bits. Additionally, forming a flute 32 in the shank portion 22 and a lead screw 34 on the end of the head portion 26 are common elements and production steps in the production of most boring bits.

However, the method of forming the present invention departs substantially from prior art boring bits in the way in which the cutting face 42 is formed. In two steps, the head portion 26 is quickly and efficiently transformed into a durable and long-lasting efficient cutting element. In a first step, the helically disposed surface 36 is both helically and frusto-conically formed. A second step forms the cutting face 42 generally parallel and perpendicularly spaced away from the central axis 28. In the two steps of forming the helical surface 36 and the cutting face 42, a scraping edge 48, cutting edge 44 and scribing edge 50 are formed.

In use, the present invention is formed as described hereinabove and then operated by a bit rotating tool such as a common drill to drive the boring bit 20 into a workpiece. Upon rotating the boring bit 20 and engaging it with a workpiece 35, the threaded lead screw 34 engages and pilots the boring bit 20 into the workpiece 35. The first portion of the head portion 26 to encounter the workpiece 35 is the scribing edge 52. The scribing edge 52 is a helical edge surrounding the helical surface 36. As the boring bit 20 is continued to be driven, the cutting edge 42 begins to cut out the material within the area scribed by the scribing tip 52. The cutting edge 4 is parallel to the central axis 28 thereby being substantially perpendicularly disposed to the material within the area scribed by the scribing tip 52. The substantially perpendicular orientation of the cutting edge 44 results in scraping material as opposed to lifting out large chips. This promotes a clean cut as the rate of material removal is suitably paced with the scribing of the material by the scribing tip 52. As the scribing tip 52 scribes the bore and the cutting edge 44 removes material from within the scribed area, the scraping edge 48 scrapes the bore as formed to further smooth an inside diameter of the bore.

Material which is removed during the boring operation is removed by and transported out of the bore through the flute 32 which is in communication with the second terminus 40 of the head portion 46. Additionally, the scribing function of the scribing tip 52 and the scraping function of the cutting edge 44 tend to produce an exit hole on the end opposite the entry point in the workpiece 35 which is not splintered or imprecisely disrupted. In other words, the present invention produces a bore through a workpiece which has a generally smooth interior surface and a clean entry and exit perimeter through the workpiece 35.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A boring bit for forming bores in one or more workpieces such as wood and the like, said boring bit including an axially elongated shank portion, a central axis longitudinally extending through said shank portion, tool engaging means on one end of said shank and a head portion on an end of said shank distal said tool engaging means, said head portion comprising:

a single helical surface on an end of the head portion for scribing the circumference of a bore in the material of a workpiece when said bit is used for forming a bore, said helical surface being defined by said surface having an axis of rotation which is generally coaxial with said central axis, said helical surface defining a helical flute extending axially along an outer surface of said shank portion;

leading and following termini of said helical surface, said leading terminus being advanced along said shank portion beyond said following terminus;

a cutting face intersecting said leading terminus for scribing and scraping material from a workpiece when said boring bit forms a bore in a workpiece;

a single cutting edge defined by an intersection of a perimeter surface and said cutting face;

a scraping edge defined by an intersection of a perimeter surface of said shank portion and said cutting face;

a continuous helical scribing edge defined by an intersection of said helical surface and said perimeter surface of said shank portion; and a scribing tip defined by an intersection of said scraping edge, said cutting edge, and said scribing edge, said scribing tip initiating the scribing function of the boring bit.

2. A boring bit according to claim 1 further including a threaded lead screw portion extending away from said helical surface coaxial with said central axis for piloting said boring bit into a workpiece when said bit is used for forming a bore in a workpiece.

3. A boring bit according to claim 1 wherein said helical surface is formed at a conic angle relative to a reference extending perpendicularly from said central axis, said helical surface sloping inwardly towards said central axis generally sloped towards said tool engaging means along said helical surface, a forward rake lead angle defined between said cutting edge and said perpendicular reference point such that said helical surface is conically sloped inwardly towards said central axis.

4. A boring bit according to claim 3 wherein said forward rake lead angle is from 3° to 9° relative to the reference extending perpendicularly from said central axis.

5. A boring bit according to claim 1 wherein said helical surface is formed sloping inwardly towards said central axis generally towards said tool engaging means at an angle measured between a tangent of a curve of said helical surface and a perpendicular reference to said central axis.

6. A boring bit according to claim 5 wherein said helical surface is formed sloping inwardly towards said central axis towards said tool engaging means and said angle is from 3° to 9°.

7. A boring bit according to claim 1 wherein said leading terminus is advanced along said shank portion more than one-half of a helical revolution around said central axis beyond said following terminus.

8. A boring bit for forming bores in one or more workpieces such as wood and the like, said boring bit including an axially elongated shank portion, a central axis longitudinally extending through said shank portion, tool engaging means on one end of said shank and a head portion on an end of said shank distal said tool engaging means, said head portion comprising:

a helical surface on an end of the head portion for scribing the circumference of a bore in the material of a workpiece when said bit is used for forming a bore, said helical surface being defined by said surface having an axis of rotation which is generally coaxial with said central axis;

leading and following termini of said helical surface, said leading terminus being advanced along said shank portion beyond said following terminus;

a cutting face intersecting said leading terminus for scribing and scraping material from a workpiece when said boring bit forms a bore in a workpiece, said cutting face having a planar extending parallel to and perpendicularly spaced away from said central axis, a positive radial rake angle measured between said planar surface of said cutting face and a reference radius extending from said central axis through an intersection of the perimeter of said shank and said cutting face;

a cutting edge defined by an intersection of said helical surface and said cutting face;

a scraping edge defined by an intersection of a perimeter surface of said shank portion and said cutting face;

a scribing edge defined by an intersection of said helical surface and said perimeter surface of said shank portion; and a scribing tip defined by an intersection of said scraping edge, said cutting edge, and said scribing edge, said scribing tip initiating the scribing function of the boring bit.

9. A boring bit according to claim 8 wherein said positive radial rake angle is from 3° to 30° measured between said plane of said cutting face and said reference radius extending from said central axis through said intersection of the perimeter of said shank and said cutting face.

10. A boring bit for forming bores in one or more workpieces such as wood and the like, said boring bit including an axially elongated shank portion, a central axis longitudinally extending through said shank portion, a head portion on an end of said shank, tool engaging means on an end of said shank distal said head portion, and a single spiral flute spirally extending through a perimeter of said shank portion from said head portion towards said tool engaging means coaxial with said central axis for providing a path through which material removed by said head portion from a workpiece is transported when forming a bore with said boring bit, said head portion comprising:

an inwardly sloped generally frusto-conical surface formed on a face of said head portion, said frusto-conical surface sloping inwardly towards said central axis;

leading and following termini of said frusto-conical surface, said leading and following termini being spaced apart around said shank, said following terminus and said spiral flute merging for promoting removal of material when said boring bit is used to form a bore in one or more workpieces;

a cutting face formed on said leading terminus for scribing and scraping a workpiece when said boring bit is used to form a bore;

a single cutting edge defined by an intersection of said frusto-conical surface and said cutting face;

a scraping edge defined by an intersection of a perimeter surface of said shank and said cutting face;

a continuous helical scribing edge defined by an intersection of said frusto-conical surface and said circumferential surface of said shank; and a scribing tip defined by an intersection of said scraping edge, said cutting edge, and said scribing edge.

11. A boring bit according to claim 10 wherein said face of said head portion comprises a complex angular surface including said frusto-conical surface and a helically disposed component, said helically disposed component defining a surface having an axis coaxial with said central axis for promoting scribing of said bore, said leading terminus being advanced along said shank portion at least one-half of a helical revolution around said central axis beyond said following terminus.

12. A boring bit according to claim 11 wherein said leading terminus is advanced along said shank portion more than one-half of a helical revolution around said central axis beyond said following terminus.

13. A boring bit according to claim 12 wherein said helically sloped component of said face is formed at an angle of from 3° to 9° relative to a reference perpendicularly extending from said central axis, said frusto-conical surface sloping inwardly towards said central axis directed towards said tool engaging means a positive angle of from 3° to 9° measured between said cutting edge and said perpendicular reference.

14. A boring bit according to claim 12 wherein said frusto-conical surface is formed sloping inwardly towards said central axis towards said tool engaging means at an angle of from 3° to 9° measured between a tangent of a curve of said helical surface and a perpendicular reference to said central axis.

15. A boring bit for forming bores in one or more workpieces such as wood and the like, said boring bit including an axially elongated shank portion, a central axis longitudinally extending through said shank portion, a head portion on an end of said shank, tool engaging means on an end of said shank distal said head portion, and a spiral thread spirally extending through a perimeter of said shank portion from said head portion towards said tool engaging means coaxial with said central axis for providing a path through which material removed by said head portion from a workpiece is transported when forming a bore with said boring bit, said head portion comprising:

a face of said head portion comprising a complex angular surface including said frusto-conical surface sloping inwardly towards said central axis and a helically disposed component, said helically disposed component defining a surface having an axis coaxial with said central axis for promoting scribing of said bore, said leading terminus being advanced along said shank portion at least one-half of a helical revolution around said central axis beyond said following terminus;

leading and following termini of said frusto-conical surface, said leading and following termini being spaced apart around said shank, said following terminus and said spiral thread merging for promoting removal of material when said boring bit is used to form a bore in one or more workpieces;

a cutting face formed on said leading terminus for scribing and scraping a workpiece when said boring bit is used to form a bore, said cutting face having a planar surface extending parallel to and perpendicularly spaced away from said central axis, a positive rake angle of from 3° to 30° measured between said planar surface of said cutting face and a radial reference radially extending from said central axis through an intersection of the perimeter surface of said shank and said cutting face perpendicular to said central axis;

a cutting edge defined by an intersection of said frusto-conical surface and said cutting face;

a scraping edge defined by an intersection of a perimeter surface of said shank and said cutting face;

a scribing edge defined by an intersection of said frusto-conical surface and said circumferential surface of said shank; and a scribing tip defined by an intersection of said scraping edge, said cutting edge, and said scribing edge.

16. A boring bit according to claim 12 wherein said cutting edge and said scraping edge linearly extend along said cutting face, said cutting edge and said scraping edge intersecting at an acute angle for forming said scribing tip having an acute angle.

17. A method of forming a boring bit for forming bores in one or more workpieces including the following steps:

providing an axially elongated shank portion having a central axis longitudinally extending therethrough;

forming a head portion on one end of said shank portion;

machining a single helically disposed surface coaxial with said central axis on said head portion for scribing one or more workpieces in which said boring bit is used to form a bore, said helically disposed surface having a single leading and a following termini, said leading terminus being advanced along said shank portion around said central axis beyond said following terminus;

machining a planar cutting face on said leading terminus for scribing and scraping material when said boring bit forms a bore.

18. A method of forming a boring bit according to claim 17 further including the step of employing a cutting tool for machining a portion of said leading terminus spaced apart and generally perpendicular to said central axis for forming said cutting face spaced apart from and generally parallel to said central axis.

19. A method of forming a boring bit according to claim 18 further including locating said cutting tool in relation to said helically disposed surface and said portion of said leading terminus for forming said cutting face defined by a scribing edge at an intersection of said cutting face and said helically disposed surface, a scraping edge at an intersection of said cutting face and said shank portion, and a generally arcuate edge in said portion of of said leading terminus.

20. A boring bit produced in accordance with the method of claim 19.

21. A method according to claim 19 further including the step of machining said cutting edge at a forward rake lead angle, said forward rake lead angle being defined between a perpendicular reference and said cutting edge, said cutting edge frusto-conically sloping inwardly away from said tip of said bit at least parallel to said central axis.

22. A method according to claim 21 further including forming said forward rake lead angle of said cutting edge frusto-conically inwardly towards said central axis of said bit at an angle of substantially on the order of from 3° to 9°.

* * * * *

UNITED STATES PATENT AND TRADEMARK OFFICE

CERTIFICATE OF CORRECTION

PATENT NO. : 5,244,319

DATED : September 14, 1993

INVENTOR(S) : Paul Cochran

It is certified that error appears in the above-indentified patent and that said Letters Patent is hereby corrected as shown below:

Column 7, Line 40 " edge 4 is " should read -- edge 44 is --

Column 8, Lines 25-26 " an intersection of a perimeter surface " should read -- an intersection of said helical surface --

Signed and Sealed this

Third Day of May, 1994

Attest:

BRUCE LEHMAN

*Attesting Officer*

*Commissioner of Patents and Trademarks*